United States Patent [19]

Northey et al.

[11] 3,990,290

[45] Nov. 9, 1976

[54] METHOD AND APPARATUS FOR FORMING SAW CHAIN CUTTER LINKS

[75] Inventors: Douglas A. Northey; Stanton W. Weber, both of Peterborough, Canada

[73] Assignee: Outboard Marine Corporation, Waukegan, Ill.

[22] Filed: Dec. 18, 1975

[21] Appl. No.: 642,130

Related U.S. Application Data

[63] Continuation-in-part of Ser. No. 467,224, May 6, 1974, Pat. No. 3,953,999.

[52] U.S. Cl. .................................. 72/381; 72/403; 76/112
[51] Int. Cl.² ...................... B21D 5/01; B21D 22/00
[58] Field of Search ............... 76/51, 112, 101 SM; 72/381, 306, 403, 382, 384

[56] References Cited
UNITED STATES PATENTS

| | | | |
|---|---|---|---|
| 3,154,972 | 11/1964 | Neumeier et al. | 76/51 X |
| 3,696,692 | 10/1972 | Baranowski et al. | 76/112 |
| 3,837,241 | 9/1974 | Weiss | 72/403 |

Primary Examiner—Milton S. Mehr
Attorney, Agent, or Firm—Michael, Best & Friedrich

[57] ABSTRACT

Disclosed herein is a method of forming a cutting link from a generally planar cutting blank, and an apparatus capable of performance in accordance with the method and comprising a stationary die part, means including a first die part movable relative to the stationary part in a first path and operable, in response to movement of the first movable die part relative to the stationary die part, to bend a shank part of the blank relative to a link part of the blank to form a link shank portion into angular relation a cutting link linking portion and to partially bend a toe part of the blank relative to the shank part, and means including a second die part movable in a direction transverse to the first path and relative to the stationary die part and operable, in response to movement of the second die part relative to the stationary die part, to cold flow the toe part to form a link toe portion into angular relation to the link shank portion and into transverse relation to the linking portion.

12 Claims, 12 Drawing Figures

METHOD AND APPARATUS FOR FORMING SAW CHAIN CUTTER LINKS

RELATED APPLICATION

This application is a continuation-in-part of our earlier U.S. application Ser. No. 467,224 filed May 6, 1974, now U.S. Pat. No. 3,953,999.

BACKGROUND OF THE INVENTION

The invention relates to methods and apparatus for forming a saw chain cutting link which includes a link portion, a shank portion extending from the link portion in angular relation thereto, and a toe portion extending from the shank portion in angular relation thereto and in spaced transverse relation to the link portion, from a saw chain cutting link blank including a first or link part which provides the link portion, a second or shank part which extends from the link part and which is formed to provide the shank portion, and a third or toe part which extends from the second part and which is formed to provide the toe portion.

Prior methods and apparatus for forming saw chain cutting links are disclosed in the following U.S. Patents:

| | | |
|---|---|---|
| NEUMEIER | 3,154,972 | issued Nov. 3, 1964 |
| BARANOWSKI | 3,696,692 | " Dec. 10, 1972 |
| WEISS | 3,837,241 | " Sept. 24, 1974 |

SUMMARY OF THE INVENTION

The invention provides a method of forming a cutting link including a link portion, a shank portion extending from the link portion in angular relation thereto, and a toe portion extending from the shank portion in angular relation thereto and in transverse relation to the link portion, from a saw chain cutting link blank including a first link part which provides the link portion, a second or shank part which extends from the link part and which is formed to provide the shank portion, and a third or toe part which extends from the second part and which is formed to provide the toe portion, said method comprising the steps of placing the blank in a die including a stationary die part and first and second movable die parts, forming the shank portion from the second part of the blank and partially forming the toe portion from the third part of the blank by bending the second part of the blank into the shank portion and the third part of the blank into a position extending in generally parallel and offset relation to the link portion in response to movement of the first movable die part in one direction relative to the stationary die part, completing the forming the third part of the blank into the toe portion by engaging and cold flowing the extending third part of the blank into the toe portion in response to movement of the second die part in a direction transverse to the one direction and relative to the stationary die part, and removing the formed link from the die.

In one embodiment of the invention, the step of completing the forming of the third part of the blank into the toe portion includes forming a cavity which is open on one side only through cooperation between the stationary die part and the first movable die part and which receives the toe part of the blank, and moving the second movable die part into the opening. Preferably, the second movable die part is dimensioned so as to wholly occupy the opening into the cavity.

The invention also provides apparatus for forming a saw chain cutting link blank including a first or link part, a second or shank part extending from the link part, and a third or toe part extending from the shank part, into a saw chain cutting link including a link portion provided by the link part, a shank portion formed from the shank part and extending from the link portion in angular relation thereto, and a toe portion formed from the toe part and extending from the shank portion in angular relation thereto and in spaced transverse relation to the link portion, which apparatus comprises a stationary die part, means including a first die part movable relative to the stationary part in a first path and operable, in response to movement of the first movable die part relative to the stationary die part, to bend the shank part relative to the link part to form the shank portion into the angular relation and to partially bend the toe part relative to the shank part, and means including a second die part movable in a direction transverse to the first path and relative to the stationary die part and operable in response to movement of the second die part relative to the stationary die part to complete bending of the toe part to form the toe portion into the angular relation to the shank portion and into the transverse relation to the link portion.

In one embodiment of the invention, the stationary die part forms a cavity open on two sides and the first die part closes one of the open sides of the cavity and the second die part enters into the cavity through the other of the open sides and is dimensioned to wholly occupy the open area of the other of the open sides.

In one embodiment of the invention, the apparatus further includes means operable in response to movement of the second die part toward the stationary die part for applying pressure on the stationary die part in the direction parallel to the direction of movement of the second die part.

In one embodiment of the invention, the apparatus comprises a stationary die part including a first surface having opposite ends, a second surface extending from one of the ends of the first surface in acute angular relation to the first surface and having an end remote from the first surface, and a third surface extending transversely from the other of the ends of the first surface, a first movable die member including a surface extending generally parallel to the third surface of the stationary die part and adapted to engage the link part of the blank, means for guiding movement of the first movable die member in a direction generally perpendicular to the third surface of the stationary die part between an extended position with the surface of the first movable die member located in spaced relation from the end of the second surface of the stationary die part and a retracted position with the surface of said first movable die member extending from the remote end of the second surface of the stationary die part, a second movable die member including a first surface extending in generally parallel relation to the third surface of the stationary die part, and adapted to engage the link part of the blank, a second surface extending from the first surface of the second movable die member in angular relation thereto and in generally parallel relation to the second surface of the stationary die part and adapted to engage the shank part of the blank, and a third surface extending from the second surface of the second movable die member in generally parallel and offset relation to the first surface of said second movable die member and adapted to engage the toe part of the blank, means for guiding movement of the second movable die member in a direction generally parallel to the direction of the first movable die member between an extended position with the second surface of the second movable die member located in spaced relation from the second surface of the stationary die part and a retracted position with said second surface of said second movable die member located in more remotely spaced relation from said second surface of said stationary die part, a third movable die member including an end portion having an end surface adapted to engage the toe part of the blank to form the toe portion in transverse relation to the link portion, and means for guiding movement of the third movable die member in a direction generally parallel to the third surface of the stationary die part and between an extended position located between the third surfaces of the stationary die part and the second movable die member and with the end surface in spaced relation to the first surface of the stationary die part and a retracted position with the end surface located in more remotely spaced relation from the first surface of the stationary die part.

One of the principal features of the invention is the provision of a cutter link forming method and apparatus wherein the shank part of the blank is formed to provide the shank portion of the cutter link by one movable die part and wherein the toe part of the blank is cold flowed to form the toe portion of the cutter link by means of another die part movable in a direction generally perpendicular to the direction of movement of the one die part.

Another of the principal features of the invention is the provision of a cutter link forming method and apparatus wherein a cavity open on two sides is formed by the stationary part of the apparatus and wherein one movable die part closes one of the sides of the cavity and wherein a second movable die part enters into the cavity through the other side to cold flow the metal of the blank to form the cutter link.

Still another of the principal features of the invention is the provision of a cutter link forming method and apparatus in which at least a portion of the link blank is cold flowed to form the toe portion of the cutter link.

Other features and advantages of the embodiments of the invention will become known by reference to the following drawings, general description, and appended claims.

Before explaining the embodiments of the invention in detail, it is to be understood that the invention is not limited in its application to the details of construction and the arrangement of the components set forth in the following description or illustrated in the drawings. The invention is capable of other embodiments and of being practiced and carried out in various ways. Also it is to be understood that the phraseology and terminology employed herein is for the purpose of description and should not be regarded as limiting.

GENERAL DESCRIPTION

Figure 1:
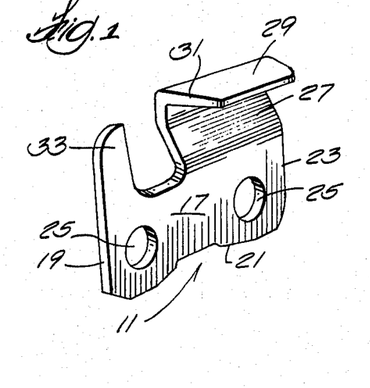
FIG. 1 is a perspective view of a cutter link which is formed from the blank shown in FIG. 2.
Figure 2:
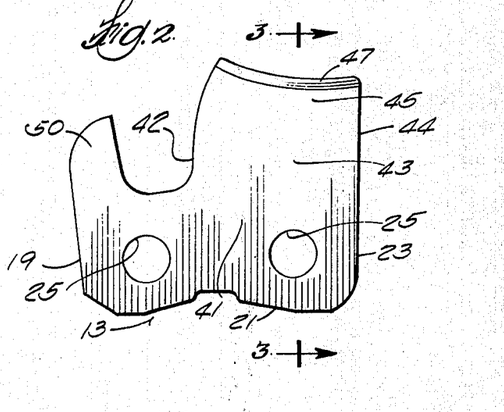
FIG. 2 is a side elevational view of the blank from which the link shown in FIG. 1 is formed by the apparatus shown in FIG. 6 and 7 in accordance with one embodiment of a method in accordance with the invention.
Figures 3, 4, 5:
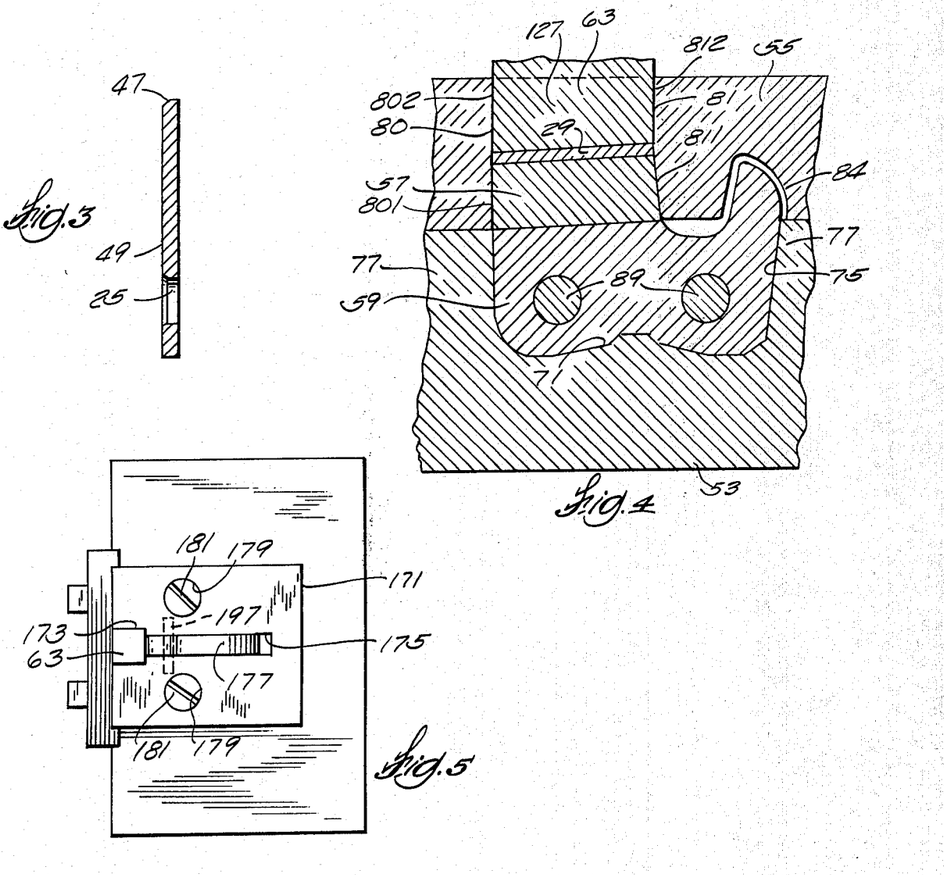
FIG. 3 is a sectional view taken along line 3—3 of FIG. 2.
FIG. 4 is an enlarged fragmentary sectional view taken along line 4—4 of FIG. 11.
FIG. 5 is a partial top view of the apparatus shown in FIG. 6.

The cutter link 11 shown in FIG. 1 is formed from the blank 13 shown in FIG. 2 by operation of a die or apparatus 15 which is shown in FIGS. 4 through 12, and which embodies various of the features of the invention, and which operates in accordance with one embodiment of a method in accordance with the invention.

The completely formed cutter link 11 includes a link portion 17 which includes leading, bottom and trailing edges or margins 19, 21 and 23, respectively, and which is provided with the usual pair of spaced apertures 25. Extending in angular relation to the link portion 17 is a shank portion 27. Also included in the cutter link 11 is a toe portion 29 which extends from the shank portion 27 in acute angular relation thereto and in spaced transverse relation to the link portion 17. The forward edge of the toe portion 29 and part of the forward edge of the shank portion 27 are sharpened to provide a cutting edge 31. The cutter link 11 can also include a depth gauge 33 which can be coplanar with the link portion 17 or which can extend in angular relation thereto.

The blank 13 is generally planar except as will be explained hereinafter and includes a first link part 41 which constitutes the link portion 17, a second or shank part 43 which extends from the link part 41, which includes forward and rearward edges 42 and 44, respectively, and which is bent to provide the shank portion 27 of the cutter link 11, and a third or toe part 45 which extends from the shank part 43 and which is formed to provide the toe portion 29 of the cutter link 11. Preferably, the toe portion 45 includes an upper end margin 47 which is concavely arcuately formed approximately as shown in FIG. 2 and which (See FIG. 3) is coined or chamfered along the blank surface 49 which becomes the outside surface of the completed link 11 as compared to the inside surface thereof. The blank 11 also includes a depth gauge portion 50 which constitutes the depth gauge 33 of the cutter link 11.

The apparatus 15 which forms the blank 13 shown in FIG. 2 into the cutter link 11 shown in FIG. 1 includes a stationary die portion 51 which supports various die components including first and second stationary die parts or members 53 and 55, respectively, and a third stationary die part, member, or anvil 57, and first, second and third movable die parts or members 59, 61 and 63, respectively, which are each movable between retracted and extended positions, as will be explained.

The first stationary die part 53 is generally of U-shape (See FIG. 4) and includes a surface 71 which conforms in shape to the leading, bottom, and trailing edges 19, 21, and 23 of the link part 41 and which, when the first movable die part 59 is located in the extended portion, as will be explained, cooperates with the first movable die part 59 to form therewith (See FIG. 8) a nest 73 which is open to one side and to the top for receiving one of the blanks 13.

Figure 6:
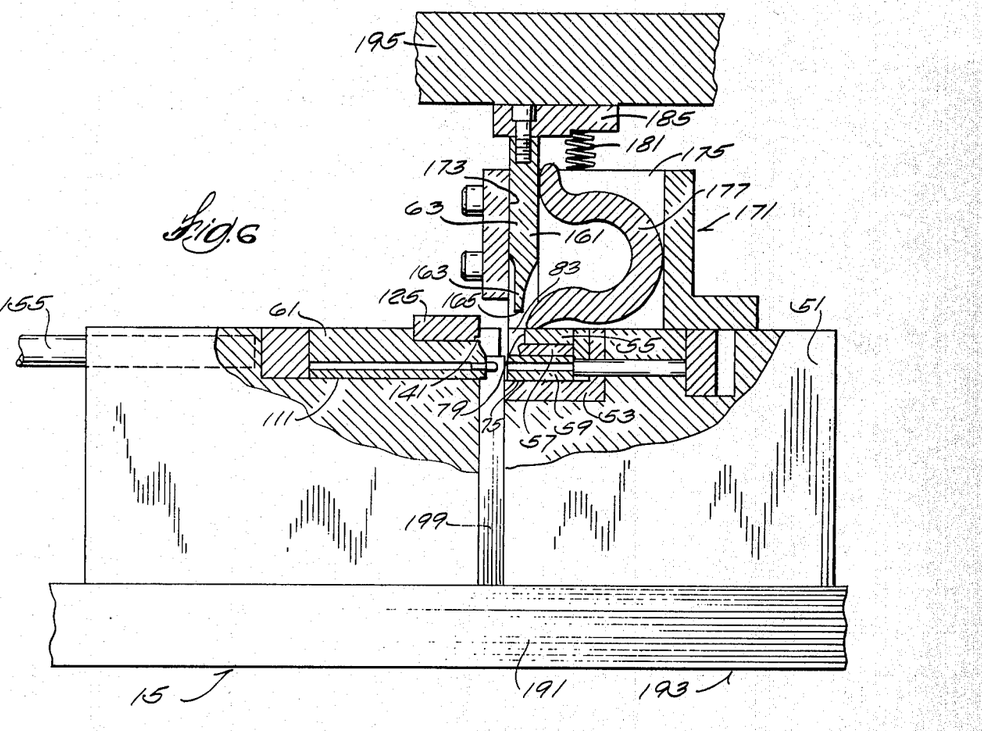
FIG. 6 is a fragmentary side elevational view with parts broken away and in section of one embodiment of a saw chain cutter link forming apparatus including various of the features of the invention.
Figure 7:
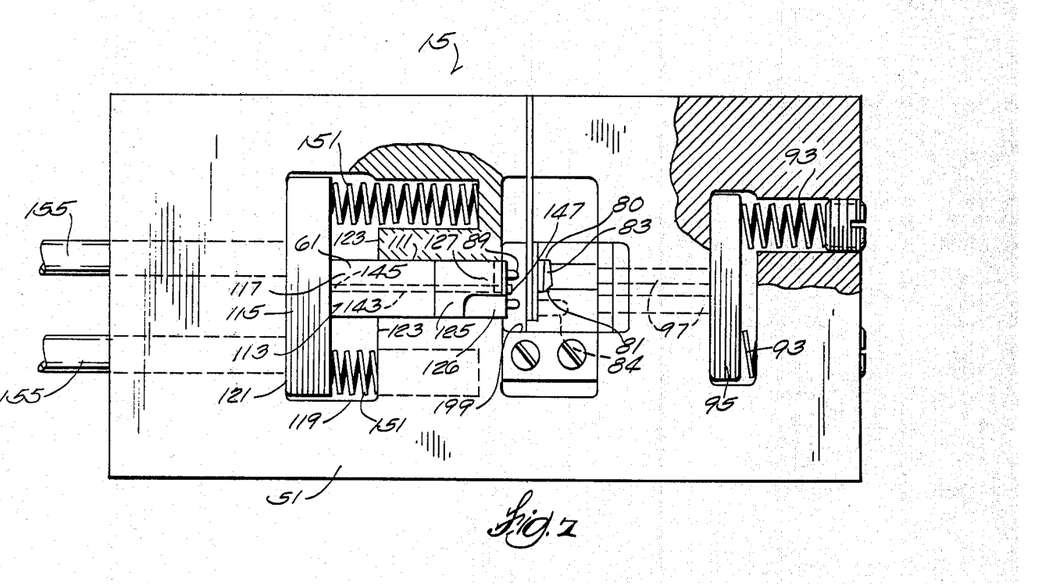
FIG. 7 is a top view, with parts omitted, of the apparatus shown in FIG. 6.

The surface 71 extends horizontally as shown in FIG. 6 and forms, in part, a guideway 75 receiving the first movable die part 59 as will be explained.

Figures 8, 9:
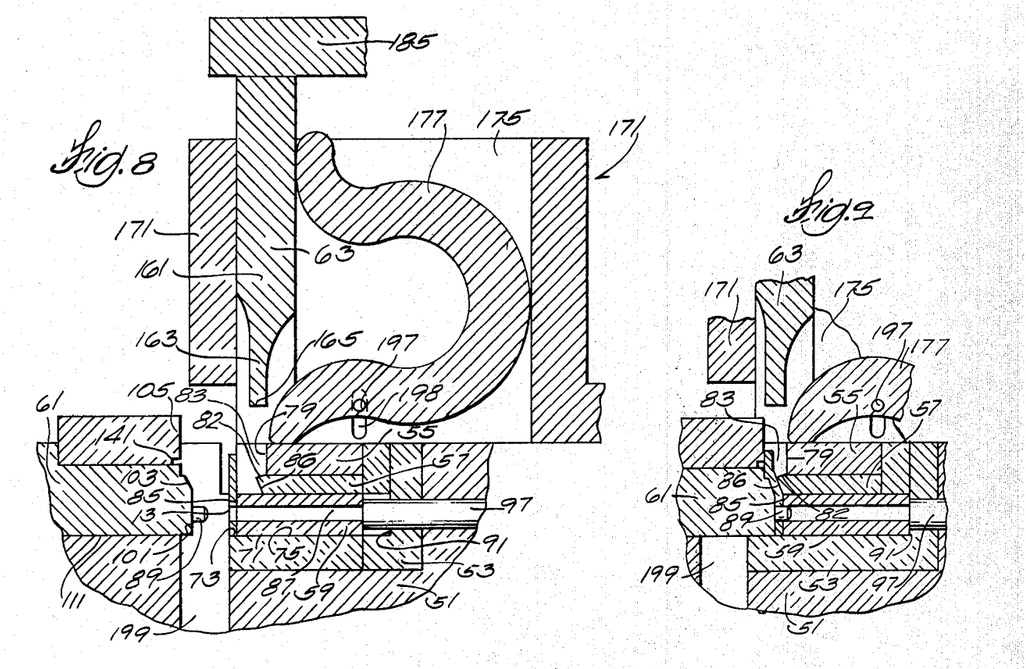
FIGS. 8 through 12 are enlarged, fragmentary views, illustrating the sequence of operations performed by the apparatus shown in FIGS. 6 and 7 during forming of the blank shown in FIG. 2 into the link shown in FIG. 1.

The second stationary die part 55 is mounted (See FIG. 4) on the top of the upwardly extending legs 77 of the first stationary die part or member 53, is of inverted U-shape and includes a generally vertically extending end surface 79 (See FIG. 8). The second stationary die part 55 also includes (See FIG. 4) opposed surfaces 80 and 81 which extend from the opposite ends of the surface 79. The opposed surfaces 80 and 81 include respective lower portions 801 and 811 between which the shank part 43 of the blank 11 extends during the forming process and respective upper portions 802 and 812 which together with the surface 79 form (See FIG. 9) a cavity 83 which has a floor or bottom formed by a surface 82 of the third stationary die part 57, still to be described, which is open at the top, and which is closed on the left (See FIG. 9) by the second movable die part 61. In addition, the second stationary die part or member 55 includes a recess 84 (See FIG. 4) permitting unhindered travel therein of the depth gauge portion 50 of the blank 13 incident to movement of the blank to the right as shown in FIGS. 8 and 9.

Located within the bite of the inverted U-shape of the stationary die part 55 and above the first movable die part or member 59 is the third stationary die part or anvil or member 57 which includes the surface 82 which extends generally horizontally to the left from the lower end of the vertical end surface 79. In addition, the third stationary die part 57 includes a second surface 86 which extends in acute angular relation to the end of the surface 82 shown to the left in FIG. 8.

The first movable die member 59 is adapted for engaging the link part 41 of the blank 13 to locate the blank 13 relative to the stationary die portion 51. The first movable die part 59 constitutes a member including a surface 85 (See FIG. 8) which extends generally parallel to the surface 79 of the second stationary die part 55 and which is adapted to engage the link part 41 of the blank 13. The member or die part 59 includes one or more and preferably two apertures or pilot pin holes 87 adapted to receive pilot pins 89 which extend from the second movable die part 61 still to be described in detail and through the apertures 25 in the link part 41 of the blank 13 so as to fix the blank 13 against movement in a plane generally parallel to the surface 79 of the second stationary die part 55.

The guideway 75 formed by the first and third stationary die parts 53 and 57 guides movement of the first movable die part in a direction generally perpendicular to the surface 79 of the second stationary die part 55. The first movable die part 59 is movable between a retracted position shown in FIGS. 9 through 11 wherein the surface 85 extends from the lower end of the second surface 86 of the third stationary die part 57 and an extended position wherein the surface 85 is spaced to the left of the surface 86 as shown in FIG. 8 so as to form the nest 73 and to accommodate automatic feed to the nest 73 of the blanks 13.

Means in the form (See FIG. 8) of one or more shoulders 91 on the first stationary die part 53 are provided for establishing the retracted position of the first movable die part 59.

Means are also provided for yieldably biasing the first movable die part 59 away from the retracted position and toward the extended position. In the illustrated construction, such means comprises (See FIG. 7) one or more compression springs 93 which bear, at one end, against the stationary die portion 51 and which act through a cross member 95 having mounted thereon one or more pusher rods or pins 97 adapted to engage the end of the first movable die part 59 remote or opposite from the surface 85.

Suitable means (not shown) can be provided on the stationary die portion 51 for limiting outward movement of the first movable die part 59 toward the extended position.

The second movable die part 61 includes (See FIG. 8) a first surface 101 which extends generally parallel to the surface 79 of the second stationary die part 55 and which is adapted to engage the link part 41 of the blank 13, a second surface 103 which extends upwardly from the first surface 101 in angular relation thereto and in generally parallel relation to the second surface 86 of the third stationary die part 57 and which is adapted to engage the shank part 43 of the blank 13, and a third surface 105 which extends upwardly of the second surface 103 in generally parallel and offset relation to the first surface 101 in generally parallel relation to the surface 79 of the second stationary die part 55.

In order to provide the shank portion 27 of the cutter link 11 with a slight side clearance angle, the second surface 103 of the second movable die part 61 preferably extends in slightly inclined relation to the second surface 86 of the third stationary die part 57. If desired, both surfaces 86 and 103 can extend at a slight angle from perpendicular to the direction of movement of the first and second movable die parts 59 and 61 so as to provide a side clearance angle.

Mounted on the second movable die part 61 and extending from the first surface 101 thereof are the pilot pins 89 which extend through the apertures 25 in the link part 41 of the blank 13 and into the apertures 87 of the first movable die part 59 so as to fixedly locate the link part 41 of the blank 13 as already mentioned.

Figure 10:
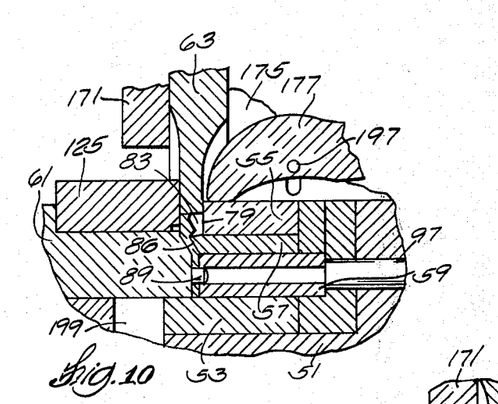
Figure 11:
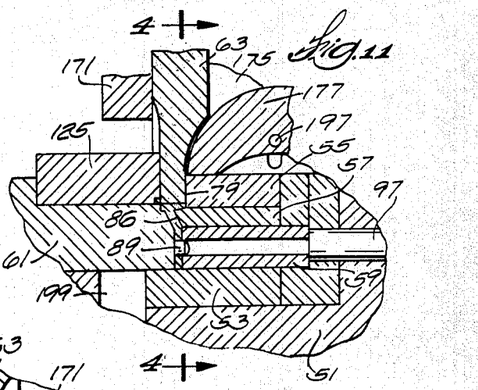
Figure 12:
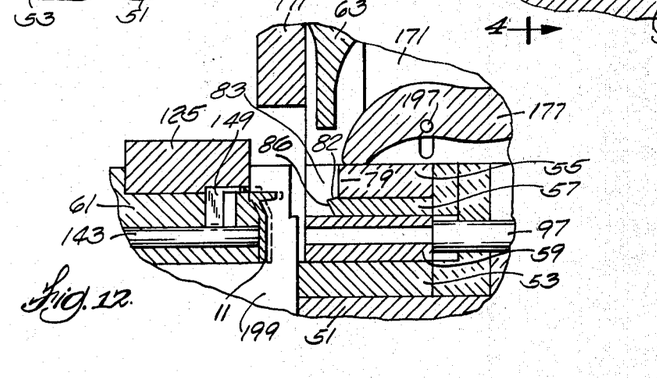

Means (See FIG. 7) in the form of a guideway 111 are provided on the stationary die portion 51 for guiding movement of the second movable die part 61 in a path parallel to the path of the first movable die part 59 and between an extended position shown in FIGS. 9, 10 and 11 and a retracted position shown in FIGS. 8 and 12.

The second movable die part 61 includes (See FIG. 7) a sliding block or member 113 which is formed in the shape of a T and includes a cross head 115 and a stem 117 which extends from the cross head 115 and, at its outer or right end, includes the first and second surfaces 101 and 103 and a relatively small lower portion of the third surface 103. The cross head 115 is located in a recess 119 which is located in the stationary die portion 51 and which has spaced walls 121 and 123 which limit movement of the second movable die part 61 toward and away from the first movable die part 59 and thereby establish the extended and retracted positions of the second movable die part 61.

Also included in the second movable die part 61 is a second block or member 125 formed (See FIG. 7) with an extending portion 127 which is defined, in part, by a recessed area 126, which at its outer edge, includes the third surface 105, and which, incident to movement of the second movable die part to its extended position shown in FIGS. 9 through 11, moves (See FIG. 4) between the surfaces 802 and 812 of the second stationary die part 55 to close the cavity 83.

The recessed area 126 permits movement of the second movable die part to the right as shown in FIGS. 8 through 12 without engaging the depth gauge portion 50 of the blank 13. If desired, the stationary die parts or members 55 and 57 and the second movable die part 61 could be formed so as to bend the depth gauge portion 50 to any desired angular relation to the link part 41 upon movement of the second movable die part 61 to the fully extended position.

In order to accommodate variations or tolerances in blank size and therefore to accept metal in excess of the requirements of the shank and toe portions 27 and 29 of the cutter link 11, the block or member 125 includes, at the lower edge thereof, a recess 141 which accommodates flow thereinto of excess metal.

Extending within the stem 117 and cross head 115 of the second movable die part 61 (See FIGS. 7 and 12) is one or more ejector or knockout pins 143 having a first end 145 adapted for engagement with the wall 121 of the stationary die portion 51 and a second end 147 which is spaced from the first end so as to extend from the first surface 101 of the second movable die part 61 when the second movable die part 61 is in its fully retracted position as shown in FIG. 12, as will be explained, thereby to knock the formed cutter link 11 off the pilot pins 89.

The knockout pin 143 also includes (See FIG. 12) a part 149 which extends, when the second movable die portion 61 is in the fully retracted position, into the recess 141 so as to knock therefrom any metal therein.

Means are provided for biasing the second movable die part 61 in the direction away from the first movable die part 59. In the disclosed construction, such means comprises (See FIG. 7) one or more compression springs 151 which, at one end, bear against a part of the stationary die portion 51 and which, at the other end, bear against the cross head 115 of the member 113 so as to locate the cross head 115 against the wall 121 of the stationary die portion 51.

Means are provided for displacing the second movable die part 61 from its retracted position shown in FIGS. 8 and 12 toward its extended position shown in FIGS. 9, 10 and 11, and for retaining the second movable die part 61 in the extended position during forming operation of the apparatus. In the disclosed construction, such means comprises (See FIGS. 6 and 7) one or more rams 155 which are actuated in proper sequence by suitable means well known in the art and which can be powered by any suitable means.

The third movable die part 63 comprises (See FIGS. 6 and 8 through 12) a member having a main body 161 and a lower end portion 163 which is of reduced cross sectional size as compared to the main body 161 and which has an end surface 165 which, upon movement of the third movable die part 63 to the extended position, enters snugly into the cavity 83 formed by the second and third stationary die parts 55 and 57 and the second movable die part 61 to engage the toe part 45 of the blank 13 and to cold flow the metal of the toe part 45 within the cavity 83 into the toe portion 29 of the cutter link 11. In this last regard, the end portion 163 of the third movable die part 63 has a cross section corresponding to the area of the opening into the cavity 83 formed between the second stationary die part 55 and the second movable die part 61 when located in its extended position.

The third movable die part 63 is supported for movement relative to the stationary die portion 51 between an extended position shown in FIG. 11 and a retracted position shown in FIGS. 8 and 12 by a stationary supporting structure 171 mounted on and forming a part of the stationary die portion 51. More particularly, the supporting structure 171 is box-like in shape and includes (See FIG. 5) a vertically extending guideway 173 for the third movable die part 63, together with a recess 175 containing a spring 177 still to be described, and a pair of cylindrical recesses 179 housing a pair of biasing springs 181 still to be described.

In this last regard, the third movable die part 63 is yieldably biased upwardly and away from the extended position shown in FIG. 11 by suitable means which, in the illustrated construction, includes the pair of compression springs 181 which are received in the recesses 179 in the structure 171, which, at their lower ends, bear against the stationary die portion 51, and which, at their upper ends, bear (See FIG. 6) against the under surface of a plate or arm 185 fixed to and forming a part of the third movable die part 63.

Means are also provided for displacing the third movable die part 63 toward the extended position shown in FIG. 11 from the retracted position shown in FIGS. 8 and 12 against the action of the springs 181. While various arrangements can be employed, the illustrated construction includes mounting (See FIG. 6) of the stationary die portion 51 on the lower or stationary platen 191 of a punch press 193 and engagement of the upper end of the third movable die part 63 by the upper platen 195 of the punch press 193.

In order to assure tight engagement between the members 53, 55, 57 and 59 in the vertical direction or direction of movement of the third movable die part 63, the spring 177 is provided. The spring 177 is a "C" type compression spring having the lower end thereof engaged against the upper surface of the second stationary die part or member 55 and having the upper end thereof engageable with the arm or plate 85 as the third movable die part approaches the fully extended position so as thereby to transmit a vertically directed force or pressure through the first, second, and third stationary die parts or members 53, 55 and 57 and through the first movable die part or member 59 to insure their tight fit one against the other. Upon retraction of the third movable die part 63, the force or pressure applied by the spring 177 is terminated and the first movable die part 59 is free to reciprocate relative to the stationary die portion 51.

In order to maintain the spring 177 in proper position (See FIG. 8) a pin 197 extends from both sides of the lower end of the spring 177 into a vertical recess 198 in the supporting structure 171.

In operation, a blank 13 is fed, preferably by automated means, to the nest 73 formed by the first stationary die part 53 and by the first movable die part 59 when the first movable die part is in its extended position.

The ram 155 or other device for displacing the second movable die part 61 is then actuated to cause the second movable die part 61 to move to the right as shown in FIGS. 8 through 12 so as to successively project the pilot pins 89 through the apertures 25 in the link part 41, and into the apertures 87 in the first movable die part 59 while, at the same time, engaging the first surface 101 of the second movable die part 61 with the link part 41 so as to thereby clampingly engage the link part 41 between the first and second movable die parts 59 and 61, and to thereafter displace the link part 41 and the first movable die part 59 to the right as shown in FIGS. 8 and 9 so as to engage the shank part 43 of the blank 13 against the surface 86 of the third stationary die or anvil 57 until the shank part 43 is bent into the desired angular relation to the link part 41 of the blank 13. Simultaneously, the toe part 45 of the blank 13 is engaged by the third surface 105 of the second movable die part 61 and, as the second movable die part approaches its fully extended position shown in FIG. 9, the toe part 45 is bent by the third surface 105 of the second movable die part 61 into generally parallel but offset relation to the link part 41 as shown in FIG. 9.

At this time, the link portion 41 is engaged around the edges 19, 21, and 23 thereof by the first stationary die part or member 53, and along the faces thereof by the first and second movable die parts 59 and 61. In addition, the shank part 43 is engaged on the opposite surfaces thereby the surface 103 of the second movable die part 61 by the surface 86 of the third stationary die part 57. In addition, the forward and rearward edges 42 and 44 of the shank part 43 lie in contact with or closely adjacent to the surfaces 801 and 811 of the second stationary die part 55. Still further in addition, when the second movable die part 61 is in the fully extended position, the outer extending portion 127 moves between the surfaces 802 and 812 to completely close the cavity 83 except for the open top. When the components are thus situated, and when the die parts or members 53, 55, 57, and 59 are vertically pressed together, the cavity 83 and the space occupied by the link part 41 and the shank part 43 provide a tightly closed chamber open only at the top.

Thereafter with the second movable die part 61 held in its fully extended position, the punch press 193 is actuated by suitable controls so as to displace the third movable die part 63 downwardly against the action of the springs 181 and into the top opening of the cavity 83 formed between the second stationary die part 55 and the second movable die part 61; As shown in FIG. 10, such displacement engages the end surface 165 of the third movable die part 63 with the upwardly projecting end of the toe part 45 of the blank 13 so as to cold flow the toe part 45 into the available space in the cavity 83, i.e., to cold flow the metal of the toe part 45 generally to the right as shown in FIG. 10 so as ultimately to form the toe portion 29.

As the third movable die part 63 continues its downward movement, the cold flowing of the metal of the toe part 45 to the right continues. Somewhat prior to full displacement of the third movable die part 63 to its fully extended position, the arm or plate 185 engages the upper end of the "C"-spring 177 to transmit vertically directed force or pressure from the third movable die part 63 to the stationary members 53, 55 and 57 so as to firmly hold them and the first movable die part 59 together as a unit.

Prior to full approach of the third movable die part 63 to its fully extended position, the recess 141 in the member 125 of the second movable die part 61 is in communication with the cavity 83 and any metal excess to the volume of the cavity 83 is permitted to flow into the recess 141. However, as the third movable die part 63 approaches its fully extended position, the end portion 163 of the third movable die part 63 closes off the recess 141 from the cavity 83 and separates any metal in the recess 141 from the metal which is located in the cavity 83 and which has been cold flowed to form the toe portion 29. As a consequence, the cutting link 11 is fully formed and substantially ready for use except for sharpening.

Upon complete formation of the cutting link 11 and after the third movable die part 63 has reached its fully extended position, the upper platen 195 of the punch press 193 recedes and the springs 181 effect upward displacement of the third movable die part 63, relieving the transmission of pressure through the C-spring 177 to the members 53, 55, 57, and 59 and withdrawing the third movable die part 63 from the cavity 83 to its fully retracted position as shown in FIGS. 8 and 12. About the same time, as the third movable die part 63 is upwardly withdrawn, the second movable die part 61 is released from its extended position and the springs 151 effect movement thereof to the left, stripping the fully formed link 11 from the stationary die parts or members 53, 55 and 57 from the first movable die part or member 59.

As the second movable die part 61 approaches its fully withdrawn or retracted position, the knockout pins 143 emerge from the stem 117 of the sliding block member 113 to strip the cutter link 11 from the pilot pins 89 and to eject any metal from the recess 141. The stripped cutter link 11 and excess metal fall through an opening 199 in the stationary die portion 51 into a suitable receptacle (not shown) for collection.

In addition, the springs 93 return the first movable die part 59 to its extended position shown in FIGS. 8 and 12.

The components of the die 15 have now operated through one full cycle and the apparatus or die 15 is now ready to receive another blank 13 into the nest 73 for forming into a cutter link 11.

In view of the detailed explanation of the operation of the apparatus, it is believed that one method in accordance with the invention is clearly apparent and accordingly a further explanation of the method is unnecessary.

It is to be noted that while the various die part surfaces have been described as being generally horizontal, or vertical, or perpendicular, or parallel to another surface, these surfaces can, in fact, be slightly angled in order to achieve top and side clearance angles. In addition, the surfaces 82 and 165 can be formed so that the upper and lower surfaces of the toe portion 29 can be either parallel to each other or taper toward the free end of the toe portion. Still further in addition, the surfaces 802 and 812 can be convergent in that area beyond, i.e., to the right of in FIG. 7, the projection of the extending portion 125 of the second movable die part 61 into the cavity 83 when the second movable die part 61 is in the fully extended position.

Various of the features of the invention are set forth in the following claims:

What is claimed is:

1. A method of forming a cutting link including a link portion, a shank portion extending from the link portion in angular relation thereto, and a toe portion extending from the shank portion in angular relation thereto and in transverse relation to the link portion, from a generally planar saw chain cutting link blank including a link part which provides the link portion, a second part which extends from the link part and which is formed to provide the shank portion, and a third part which extends from the second part and which is formed to provide the toe portion, said method comprising the steps of placing the blank in a die including a stationary die part and first and second movable die parts, forming the shank portion from the second part of the blank and partially forming the toe portion from the third part of the blank by bending the second part of the blank into the shank portion and the third part of the blank into a position extending in generally parallel and offset relation to the link portion in response to movement of the first movable die part in one direction relative to the stationary die part, completing the forming the third part of the blank into the toe portion by engaging and cold flowing the extending third part of the blank into the toe portion in response to movement of the second die part in a direction transverse to the one direction and relative to the stationary die part, and removing the formed link from the die.

2. A method in accordance with claim 1 wherein the shank part is bent in response to forced movement of the link part of the blank relative to the stationary die part by movement of the first movable die part.

3. A method in accordance with claim 1 wherein the step of completing the forming of the third part of the blank into the toe portion includes forming a cavity which is open on one side only through cooperation between the stationary die part and the first movable die part and which receives the toe part of the blank and moving the second movable die part into the opening.

4. A method in accordance with claim 3 wherein the second movable die part is dimensioned so as to wholly occupy the opening into the cavity.

5. Apparatus for forming a saw chain cutting link blank including a link part, a shank part extending from the link part, and a toe part extending from the shank part, into a saw chain cutting link including a link portion provided by the link part, a shank portion formed from the shank part and extending from the link portion in angular relation thereto, and a toe portion formed from the toe part and extending from the shank portion in angular relation thereto and in transverse relation to the link portion, said apparatus comprising a stationary die part, means including a first die part movable relative to said stationary part in a first path and operable, in response to movement of said first movable die part relative to said stationary die part, to bend the shank part relative to the link part to form the shank portion into said angular relation and to partially bend the toe part relative to the shank part, and means including a second die part movable in a direction transverse to said first path and relative to said stationary die part and operable in response to movement of said second die part relative to said stationary die part to complete bending of the toe part to form the toe portion into said angular relation to the shank portion and into said transverse relation to the link portion.

6. Apparatus in accordance with claim 5 wherein said stationary die part forms a cavity open on two sides and wherein said first die part closes one of said open sides of said cavity and said second die part enters into said cavity through the other of said open sides and is dimensioned to wholly occupy the open area of said other of said open sides.

7. Apparatus in accordance with claim 5 and further comprising means including a third die part movable in a second path parallel to said first path and relative to said stationary die part for cooperation with said first die part to move and to hold the link part relative to said stationary die part.

8. Apparatus in accordance with claim 7 wherein said first and second paths are rectilinear.

9. Apparatus in accordance with claim 7 and further including means operable in response to movement of said second die part toward said stationary die part for applying pressure on said stationary die part in the direction parallel to the direction of movement of said second die part.

10. Apparatus for forming a saw chain cutting link blank including a link part, a shank part extending from the link part, and a toe part extending from the shank part, into a saw chain cutting link including a link portion provided by the link part, a shank portion formed from the shank part and extending from the link portion in angular relation thereto, and a toe portion formed from the toe part and extending from the shank portion in angular relation thereto and in transverse relation to the link portion, said apparatus comprising a stationary die part including a first surface having opposite ends, a second surface extending from one of said ends of said first surface in acute angular relation to said first surface and having an end remote from said first surface, and a third surface extending transversely from the other of said ends of said first surface, a first movable die member including a surface extending generally parallel to said third surface of said stationary die part and adapted to engage the link part of the blank, means for guiding movement of said first movable die member in a direction generally perpendicular to said third surface of said stationary die part between an extended position with said surface of said first movable die member located in spaced relation from said end of said second surface of said stationary die part and a retracted position with said surface of said first movable die member extending from said remote end of said second surface of said stationary die part, a second movable die member including a first surface extending in generally parallel relation to said third surface of the said stationary die part and adapted to engage the link part of the blank, a second surface extending from said first surface of said second movable die member in angular relation thereto and in generally parallel relation to said second surface of said stationary die part and adapted to engage the shank part of the blank, and a third surface extending from said second surface of said second movable die member in generally parallel and offset relation to said first surface of said second movable die member and adapted to engage the toe part of the blank, means for guiding movement of the second movable die member in a direction generally parallel to the direction of said first movable die member between an extended position with said second surface of said second movable die member located in spaced relation from said second surface of said stationary die part and a retracted position with said second surface of said second movable die member located in more remotely spaced relation from said second surface of said stationary die part, a third movable die member including an end portion having an end surface adapted to engage the toe part of the blank to form the toe portion in transverse relation to the link portion, and means for guiding movement of said third movable die member in a direction generally parallel to said third surface of said stationary die part and between an extended position located between said third surfaces of said stationary die part and of said second movable die member and with said end surface in spaced relation to said first surface of said stationary die part and a retracted position with said end surface located in more remotely spaced relation from said first surface of said stationary die part.

11. Apparatus in accordance with claim 10 wherein said stationary die part forms a cavity open on two sides and wherein said second die member closes one of said open sides of said cavity and said third die member enters into said cavity through the other of said open sides and is dimensioned to wholly occupy the open area of said other of said open sides.

12. Apparatus in accordance with claim 10 and further including means operable in response to movement of said third die member toward said stationary die part for applying pressure on said stationary die part in the direction parallel to the direction of movement of said third die member.

* * * * *